United States Patent
Vital et al.

[15] 3,673,485
[45] June 27, 1972

[54] DUAL OSCILLATOR CHARGER-INVERTER CIRCUIT

[72] Inventors: Zoltan Vital, Brussels; Jean Orban, Clabecq, both of Belgium

[73] Assignee: Photronic International Establishment, Vaduz, Liechtenstein

[22] Filed: April 20, 1971

[21] Appl. No.: 135,591

[30] Foreign Application Priority Data

| April 23, 1970 | Belgium | 88149 |
| Aug. 24, 1970 | Belgium | 93115 |
| Nov. 3, 1970 | Belgium | 95875 |

[52] U.S. Cl. ................................320/2, 315/241, 320/1, 320/5, 321/2
[51] Int. Cl. ................................H02j 7/00, H02m 3/22
[58] Field of Search................320/1, 2, 5, 21, 56; 321/2, 321/4; 307/66, 67, 18, 19, 46, 108, 109; 331/49; 315/241 R, 241 P, 241 S

[56] References Cited

UNITED STATES PATENTS

| 3,017,559 | 1/1962 | Mallory | 321/2 X |
| 3,316,445 | 4/1967 | Ahrons | 315/241 X |
| 3,325,716 | 6/1967 | Gomi | 321/2 |
| 3,594,627 | 7/1971 | Lesher | 320/21 |

Primary Examiner—William M. Shoop, Jr.
Assistant Examiner—Robert J. Hickey
Attorney—Spencer & Kaye

[57] ABSTRACT

In a system for supplying power to a load selectively from a rechargeable battery or from an external power source and for recharging the battery from such power source, a dual converter connectable between the battery, the load and the power source and including components forming a first converter for delivering power from the battery to the load and a second converter for converting the energy from the power source into oscillations and applying such oscillations for recharging the battery, the arrangement being composed of switch means for operatively connecting only one converter at a time, a single transformer core, and a plurality of winding wound on the core, with at least one of the winding being common to both converters.

5 Claims, 7 Drawing Figures

INVENTORS.
Zoltan Vital
Jean Orban

BY Spencer & Kaye
ATTORNEYS.

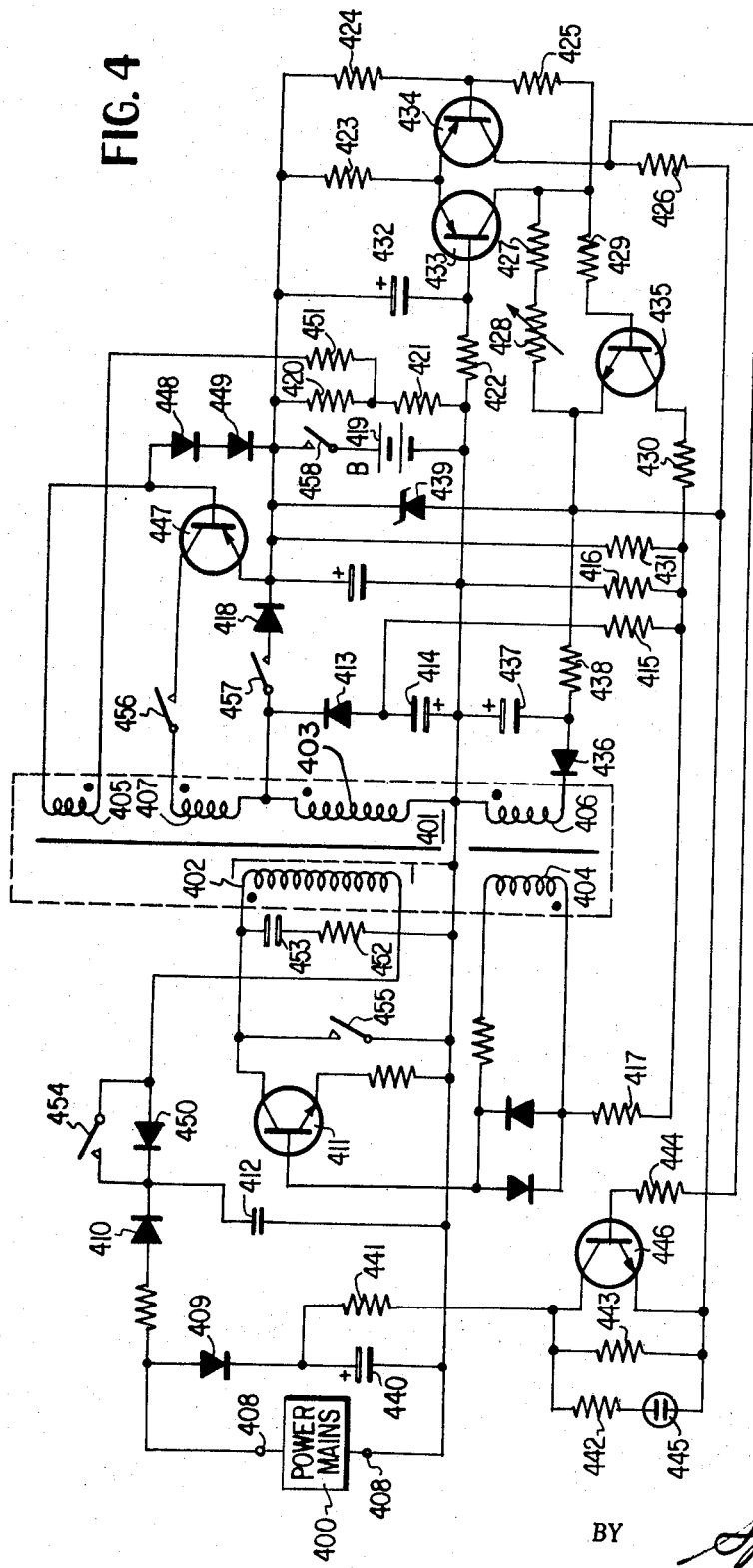

INVENTORS.
Zoltan Vital
Jean Orban

DUAL OSCILLATOR CHARGER-INVERTER CIRCUIT

BACKGROUND OF THE INVENTION

The present invention relates to energy converters, and particularly to converters for selectively feeding a load either from a rechargeable battery or an external power source and for recharging the battery from the power source.

The system according to the present invention is applicable primarily, but not exclusively, to electronic photoflash systems. These systems include a flash tube which receives energy for producing a flash from a charged storage capacitor. Many systems have already been proposed for permitting the capacitor to be charged from a rechargeable battery forming a part of the system or from an external power source, such as the power mains of a building. Such systems often include a separate unit for recharging the battery from the building mains.

While many improvements have been made in these systems, they remain relatively bulky and expensive. In particular, the charging unit requires a relatively large transformer to operate efficiently at the frequency of the building mains.

SUMMARY OF THE INVENTION

It is a primary object of the present invention to provide an improved system of the type described above.

Another object of the invention is to reduce the size and cost of such systems.

A further object of the invention is to provide a compact and inexpensive system for selectively recharging the battery and supplying the load from an external power source or supplying the load from the rechargeable battery.

These and other objects according to the invention are achieved by a novel dual converter arranged to be connected between the external power source, the rechargeable battery and the load. The dual converter according to the invention is composed of a first group of components constituting a first converter connectable for applying power to the load from the rechargeable battery, and a second group of components constituting a second converter connectable between the external power source and both the battery and the load, this second converter including an oscillator producing an output having a frequency higher than that of the external power source and connected to both charge the battery and supply the load. The system according to the invention includes a single transformer core having a plurality of windings, with at least one of the windings being common to both converters, and switch means for selectively placing only one converter into operation at a time.

The system according to the invention offers the advantage that it constitutes a relatively compact and inexpensive system performing all of the functions of supplying the load from either the battery or an external power source and recharging the battery from the external source. The reduction in size is due in large measure to the use of an oscillator having a higher frequency than the a.c. power source. This permits the size of the transformer to be reduced and the efficiency of the energy coupling between the transformer windings to be increased.

Further, the system according to the invention can be operated by either a d.c. power source or an a.c. power source having a wide range of frequencies. Embodiments of the system according to the invention can stabilize the level of charging current applied to the battery independently of variations in the voltage of the external power source.

Systems according to the invention can be easily made to taper off the rate of charging of the battery as it approaches full charge. Further the transformer of systems according to the invention provides d.c. isolation between the power source and the battery and/or load.

In specific embodiments of the invention, d.c. isolation is maintained between the external power source and the battery by the provision of an electro-optical or thermal linkage between the battery and the external power source. In other embodiments of the invention, the circuit is arranged to charge the battery during one half of each cycle of the external power source output and to effectively open the battery circuit during the other half-cycle for permitting the no-load voltage of the battery to be measured.

BRIEF DESCRIPTION OF THE DRAWINGS

FIG. 4 is a circuit diagram of a second embodiment of the invention.

FIG. 5 is a chart illustrating the switching relations in the circuit of FIG. 4.

DESCRIPTION OF THE PREFERRED EMBODIMENTS

Figure 1:
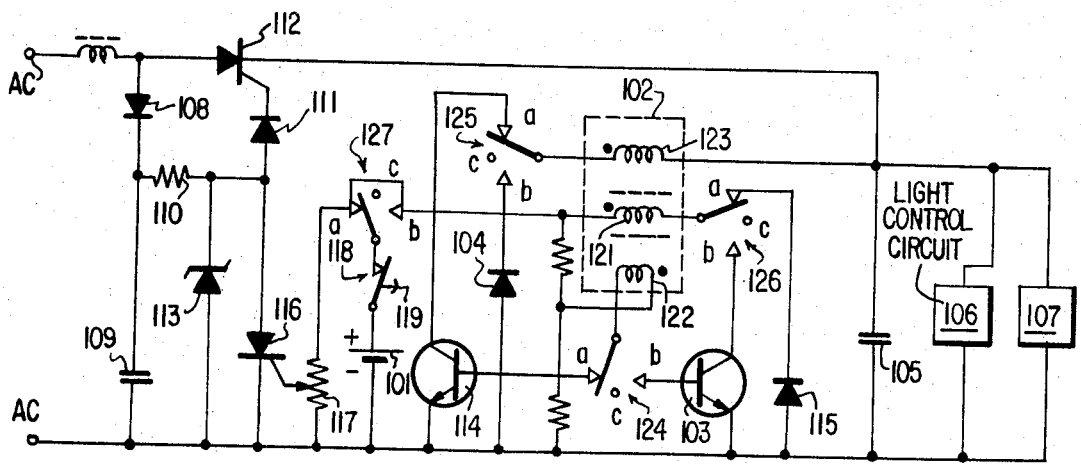
FIG. 1 is a circuit diagram of one preferred embodiment of the invention.

FIG. 1 illustrates an electronic photoflash equipped with a light control device and combined with a fast automatic charger according to the invention. The arrangement includes a nickel-cadmium battery 101 connected to supply a first converter composed of a transformer 102 having windings 121, 122 and 123, a transistor 103, a rectifier diode 104, and a discharge capacitor 105. The circuit also icludes a light control circuit 106 and all the other necessary components 107 of a known electronic photoflash. Capacitor 105 provides the power for producing the light flashes.

A four-pole triple throw switch having poles 124, 125, 126 and 127 is connected to permit selective operation of either converter, while the third position is the off position. In FIG. 1, the movable contacts of the poles are in position a, corresponding to the battery recharge and a.c. flash energization. Position b is the battery flash operating position and position c is the off position.

The battery 101 is recharged in the following way: current is applied from the building current system between terminals AC and is rectified by means of a half-wave rectifier diode 108. The rectified current charges a filtering capacitor 109. The voltage induced across the filtering capacitor 109 supplies the gate of a thyristor 112 through the resistor 110 and the diode 111 and renders the thyristor conductive. This thyristor 112 will rectify the building current and charge the discharge capacitor 105.

As soon as the voltage across the terminals of the discharge capacitor 105 reaches the limit voltage of the Zener diode 113, the gate of the thyristor 112 is no longer actuated and this thyristor returns to the non-conducting state. This halts the charging of the discharge capacitor 105.

This charging process recommences as soon as the voltage of the discharge capacitor 105 becomes again inferior to the limiting voltage of the Zener diode 113.

The voltage of the discharge capacitor 105 will always be approximately equal to the Zener diode limit voltage, for the usual voltages of the building supply mains. The voltage across the discharge capacitor 105 supplies a second converter composed of the transformer 102, a transistor 114 and a rectifier 115, which converter supplies the recharging current for the battery 101.

This recharging current is constant independent of the voltage of the building mains. Consequently, this device does not require a selecting switch for various alternating supply voltages.

The two converters are basically oscillators combined with suitable rectifiers for providing a unidirectional current flow to the discharge capacitor and/or the battery.

When the poles 124–127 of the mode selector switch are in the position a, illustrated, for recharging the battery 101 and charging the capacitor 105, the connections for the oscillator of the second converter are completed. This oscillator is essentially composed of the transistor 114 and the transformer windings 123 and 122. An operating voltage is supplied to the collector of transistor 114 by connecting capacitor 105 across the collector-emitter path thereof via transformer winding 123 and switch pole 125.

When pole 125 is initially moved into position a, the current transient through winding 123 induces a corresponding voltage transient in secondary winding 122. This latter voltage is applied to the base of transistor 114 with a polarity which triggers the buildup of oscillations in the collector-emitter circuit of the transistor. The relation between the voltages induced in transformer windings 122 and 123 results in sustained oscillations and the parameters of the various components of the oscillator cause these oscillations to have a frequency higher than that applied to the inputs a.c. of the circuit. The resulting oscillating voltage applied across winding 123 induces a corresponding alternating voltage in winding 121. The alternating voltage in winding 121 is rectified by diode 115 and the resulting pulsating d.c. voltage is applied via switch pole 127 to charge battery 101.

A resistive voltage divider connected across the battery and having a tap connected to one terminal of winding 122 provides the bias of the winding.

For normal battery operation, the mode selector switch is moved to place its poles in the b position. In this position, the connections for the first converter are completed. This first converter is constituted essentially by an oscillator composed of transistor 103 and transformer windings 121 and 122 and a diode rectifier 104 connected in circuit with transformer winding 123 and discharge capacitor 105.

When the poles are initially switched into position b, battery 101 applies an operating voltage across the collector-emitter path of transistor 103 and the current transient in winding 121 induces a voltage in winding 122 to begin the production of oscillations in transistor 103. The alternating voltage produced across winding 121 by these oscillations induces a corresponding alternating voltage in winding 123. This voltage is rectified by diode 104 so as to cause a pulsed unidirectional voltage to be applied to charge capacitor 105.

Because the energy actually applied for either charging the battery 101 from the a.c. power supply or for charging the capacitor 105 from the battery is provided by an alternating voltage having a frequency higher than that of the a.c. building supply, the transformer 102 can be made smaller than the transformer of a device operating directly at the building supply frequency and a more efficient energy transfer is realized between the windings of the transformer. Further, the structure according to the invention can be made smaller than prior art structures also because the same transformer windings are employed for both converters.

The thyristor 116 and the potentiometer 117 constitute a circuit for terminating the recharging of the battery 101. As soon as the voltage of the battery 101 reaches the value corresponding to a full charge, the thyristor 116 becomes conductive and short-circuits the Zener diode 113, which has the result of halting the charging of the discharge capacitor 105.

Because the second converter, or a.c. charger converter, is no longer supplied with current, it stops the recharging of battery 101.

A thermal switch 118 connected in series with the battery 101 opens the battery circuit as soon as the temperature of the environment reaches a predetermined level.

The reclosing of this thermal switch can be effected by means of a push button 119.

Figure 2:
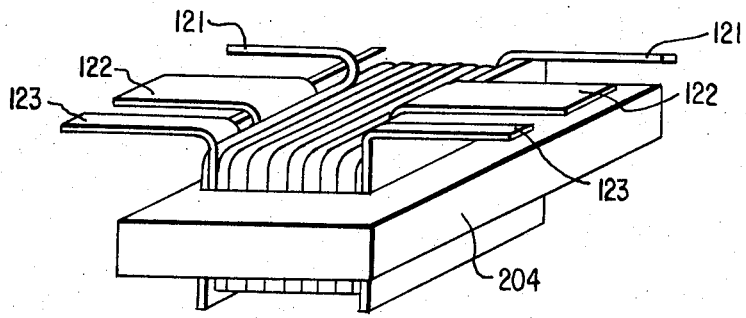
FIG. 2 is a perspective view of one component of the circuit of FIG. 1.

FIG. 2 illustrates one exemplary but non-limiting embodiment of the common transformer 102 of both converters.

This transformer is constituted by a magnetic core 204 and three windings 121, 122 and 123.

In the position a of switch 124–127, winding 123 serves as the transformer primary and winding 121 as the secondary of the second, or battery charging, converter, while their functions are reversed for switch position b, corresponding to the activation of the first, or battery supply, converter. The winding 122 serves in both cases as a feedback control winding.

Figure 3:
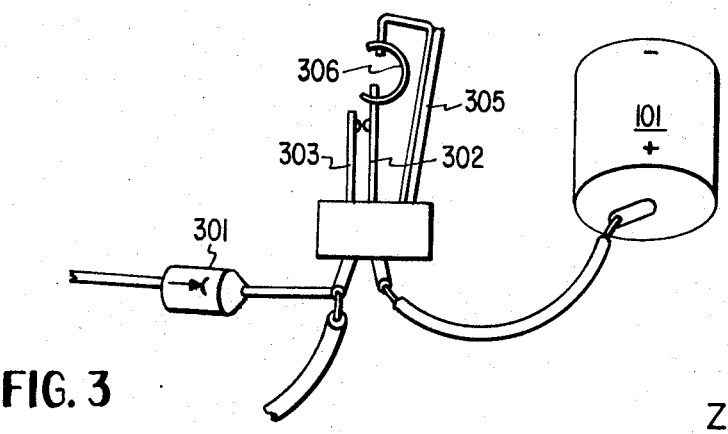
FIG. 3 is a pictorial view of another component of the circuit of FIG. 1.

FIG. 3 illustrates one embodiment of thermal switch 118. The switch includes a fixed contact 303 connected to a rectifier 301 and a movable contact 302 connected to the positive terminal of the battery 101. The switch further includes a bimetallic blade 305 arranged to flex in response to temperature changes and connected to movable contact 302 by a pivot linkage 306 when the temperature of blade 305 exceeds a predetermined value.

Referring now to FIG. 4, there is shown another embodiment of the invention composed of two converters having the core of transformer 401 in common, this transformer having six windings 402, 403, 404, 405, 406 and 407.

The second converter (a.c. mains battery) is supplied by the a.c. building supply 400 and serves to recharge the battery 419. This converter is constituted by the terminals 408, the diode 410, the capacitor 412, the transistor 411, the windings 402, 403 and 404 and the diode 418.

The second converter is controlled by a regulation circuit which permits the converter to be supplied by any alternating or direct current electric network regardless of its voltage and frequency. This regulation circuit is composed of the diode 413, the capacitor 414, and resistances 415, 416 and 417.

A control circuit serves to detect the state of charge of the battery 419 and to control and the current supplied by the second converter. This circuit is constituted by the resistances 422, 423, 424, 425, 426, 427, 428, 429, 430 and 431, the capacitor 432, and the transistors 433, 434 and 435. The supply of this control circuit is constituted by the winding 406, the rectifier 436, the capacitor 437, the resistance 438 and the Zener diode 439. An indicator circuit indicates the mode in which the second converter is operating either fast recharge or maintenance, i.e. slow or trickle, recharge. This circuit is composed of the diode 409, the capacitor 440, the resistances 441, 442, 443 and 444, the neon tube 445 and the transistor 446.

The first converter (battery-capacitor) is supplied by the battery 419 and serves to charge the capacitor 412, which is the photoflash energy supply capacitor. This first converter is constituted by the transistor 447, the windings 402, 403, 405 and 407, the diodes 448, 449 and 450, the resistances 420, 421, 451 and 452, and the capacitor 453.

The set of contacts 454 to 458 serves to selectively complete the circuit of either one of the two converters. In FIG. 4, the switches are shown in the position for placing the second converter into operation. FIG. 5 illustrates the switch positions for each converter configuration and for the circuit off condition.

The operation of these circuits is the following: To place the second converter into operation, the voltage of the electric power system 400 is applied to the terminals 408, rectified by the diode 410 and applied to the capacitor 412. This voltage also supplies the winding 402 and the transistor 411 through the set of contacts 454. The winding 404 provides a positive feedback to the base of the transistor 411 such as to cause the latter to produce an oscillating current. The winding 403 supplies a current to the battery 419 through the set of contacts 457 and the diode 418.

The regulation circuit functions as follows: The negative voltage half-cycles which are proportional to the supply voltage of the second converter, are rectified by the diode 413 and charge the capacitor 414 to a negative voltage which will be proportional to the voltage of the electric power mains. This negative voltage is applied as a bias through the resistances 415, 416 and 417 to the base of the transistor 411, which has the effect of diminishing the current of the converter when the voltage of the electric power mains increases, and due to this fact the regulation circuit maintains the power of the converter at a constant value.

The control circuit functions as a Schmitt trigger in which the transistor 433 becomes conductive as soon as the voltage of the battery 419 exceeds a predetermined value, adjustable by the resistance 428. This has the effect of rendering the transistor 435 conductive, which increases the negative biasing of the transistor 411 and thus diminishes the current of the second converter.

The supply for this control circuit is provided by the voltage supplied by the winding 406, rectified by the diode 436, filtered by the capacitor 437 and stabilized by the resistance 438 and the Zener diode 439.

The neon tube 445 is supplied by the voltage of the network 400 which voltage is rectified by the diode 409 and filtered by the capacitor 440, and is controlled by the transistor 446 to light as soon as the transistor 433 becomes conductive.

The first converter functions in a standard manner.

In this embodiment, transistor 411 constitutes the active component of the oscillator of the second converter, which is the converter for charging the battery from the power mains. In this case, winding 402 serves as the primary winding for the oscillator output and winding 403 is the secondary winding applying a charging voltage to the battery 419, this voltage being rectified by diode 418. Winding 404 serves as the feedback winding for applying the necessary control voltage to the base of transistor 411.

The active component of the oscillator of the first converter, for charging the discharge capacitor from the battery is constituted by transistor 447. In this converter, windings 403 and 407 cooperate to form the primary winding, winding 402 is the secondary winding for applying a charging voltage to discharge capacitor 412 of the photoflash and winding 405 is the feedback winding for applying the necessary control voltage to the base of transistor 447.

According to a further feature of the invention, the dual converter is equipped with a circuit which includes an electrooptical feedback path to stabilize the current supplied to the load at a predetermined value, a circuit which permits a reduction or termination of the current supplied to the load, and a third circuit which allows measurement of the no-load voltage of the battery.

Figure 6:
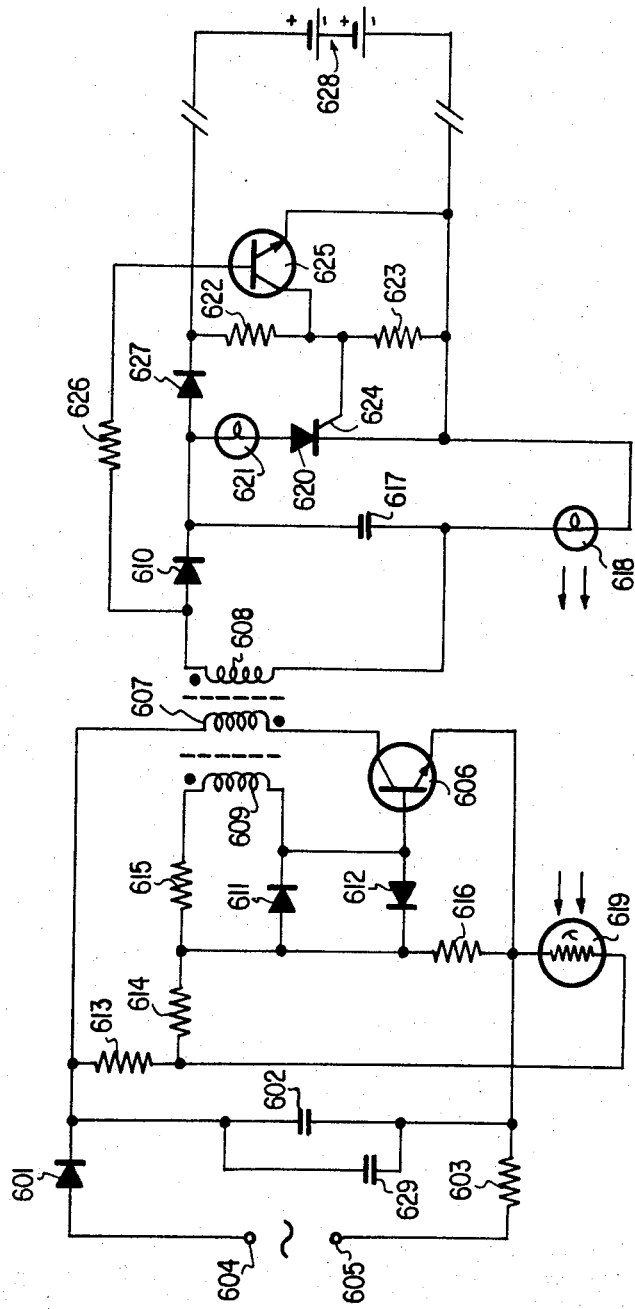
FIG. 6 is a circuit diagram of a third embodiment of the invention.

FIG. 6 shows one embodiment of such an arrangement, equipped with a voltage sensor connected to the load for reducing or terminating the charging current.

In the circuit of FIG. 6, the rectifier 601, the capacitor 602, the resistor 603 and the terminals 604 and 605 for connection to the AC mains constitute the supply circuit of the AC battery converter. The converter is composed of the transistor 606, the windings 607, 608 and 609 of a transformer, the rectifier 610, the diodes 611 and 612, the biasing resistors 613, 614, 615 and 616, and the capacitor 617. The stabilization circuit consists of the incandescent lamp 618 and the photoconductive cell 619. The current reducing and terminating circuit is composed of the thyristor 620 and the incandescent lamp 621. The voltage sensor circuit is composed of the resistors 622 and 623 and the gate 624 of the thyristor 620. The circuit for measuring the no-load voltage of the battery consists of a transistor 625 and the resistor 626. The device is completed by the diode 627 and the battery 628.

This circuit operates as follows: the voltage of the AC mains is rectified and filtered due to the rectifier 601 and capacitor 602, and supplies a direct voltage powering a "blocking oscillator" type converter. The voltage across the secondary winding 608 is rectified and filtered by means of the rectifier diode 610 and the capacitor 617 and supplies the charging current to the battery 628 through the diode 627 and the incandescent lamp 618. This lamp remains lit as long as the battery is being charged.

The resistors 613, 614 and 616 and the photoconductive cell 619 determine the bias voltage of the transistor 606 of the converter, and constitute the power control circuit of the converter.

The photoconductive cell 619 receives the light emitted by the incandescent lamp 618. If the charging current increases, the light emitted by the incandescent lamp 618 will equally increase, and the value of the resistance of the photoconductive cell 619 will diminish, which will decrease consequently the bias voltage of the transistor 606, and this will diminish the output current of the converter. If the charging current diminishes, an opposite reaction will result. This results in the stabilization of the charging current of the battery at a predetermined value while maintaining at the same time the conductive isolation between the primary and the secondary.

The voltage of the battery 628 is applied to the gate 624 of the thyristor 620 by means of the resistors 622 and 623. As soon as this voltage reaches a predetermined value, the thyristor 620 is fired, and a part of the charging current is diverted through the thyristor 620 and the incandescent lamp 621. This lamp lights when the predetermined voltage is reached, and goes out when the a.c. mains are disconnected. The value of the intensity of the slow charging current which will subsist for charging of the battery as long as the mains are connected will equal the difference between the values of the intensity of the stabilized current passing through lamp 618 and of the intensity of the current diverted through the thyristor 620 and passing through lamp 621.

The voltage of the secondary winding 608 is applied through a resistor 626 to the base of the transistor 625 to render it conductive during the positive alternances of that voltage and nonconductive during the negative alternances thereof. Thus, in the first case, when a charging current is being applied to the battery, the turn-on voltage of the gate 624 is removed, whereas in the second case, when a charging current is not applied to the battery, the gate voltage to gate 624 is determined by the voltage of the battery 628 and by the resistors 622 and 623. Only in the second case, during the period in which there is no charging current to the battery, the thyristor 620 can be fired, and this permits the sampling of the no-load voltage of the battery, without any error caused by the voltage drops in the different resistors of the circuit.

The diode 627 prevents the discharge of the battery 628 when the a.c. mains are disconnected.

The storage capacitor 629 provides the light energy for the photoflash tube.

Figure 7:
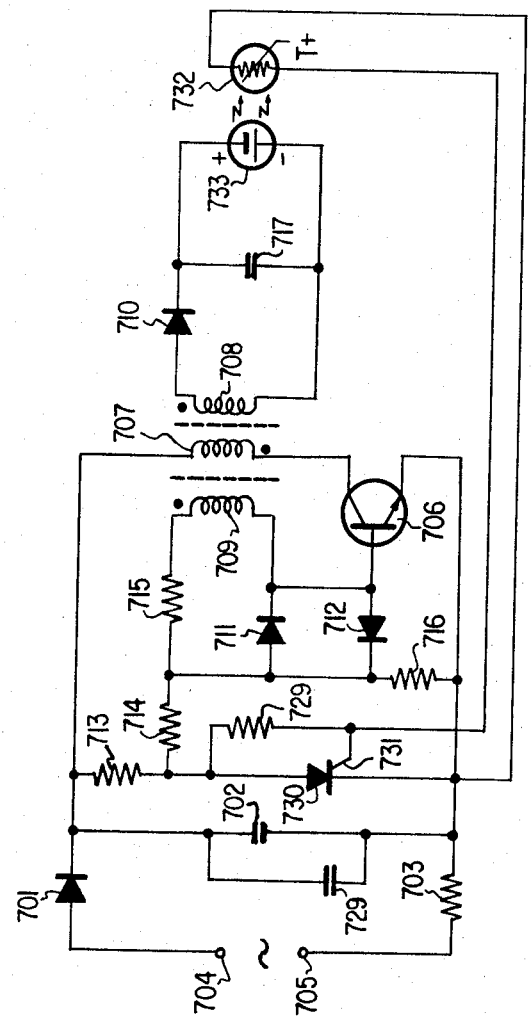
FIG. 7 is a circuit diagram of a fourth embodiment of the invention.

FIG. 7 illustrates a simplified version of FIG. 6, without stabilization, but with a thermal sensor in place of a voltage sensor. Those components of the FIG. 7 circuit which are identical with those of FIG. 6 are identified by reference numerals having the same last two digits.

The components of the circuit of FIG. 7 which differ from those of the FIG. 6 device constitute a current reducing circuit and a sensor circuit. These components are the resistor 729, the thyristor 730 having gate 731, the resistor 732 having a positive temperature coefficient and a battery 733 of a type of which the end of charge is indicated by an increase in its temperature rather than an increase in its voltage, like the voltage of the battery 628. Battery 733 is in thermal communication with resistor 732. This type of battery is currently manufactured, for instance by Union Carbide Corp. under the denomination "CF 225 T", "CF 450 T", "CF 500", etc.

These circuits operate as follows: the resistor 729 and the resistor 732 having a positive temperature coefficient determine the bias voltage of the gate 731 of thyristor 730. As the temperature of the battery 733 increases, the resistance of the resistor 732 and the voltage at the gate 731 of thyristor 730 also increase. When the temperature reaches a predetermined value, the thyristor 730 will fire, reducing the voltage applied to the base of transistor 706 to a value below that required for maintaining the transistor in its conducting state. When transistor 706 becomes nonconductive, current flow through winding 707 ceases and the charging of battery 733 is halted.

The storage capacitor 729 provides the light energy for the photoflash tube.

It will be understood that the above description of the present invention is susceptible to various modifications, changes and adaptations and the same are intended to be comprehended within the meaning and range of equivalents of the appended claims.

We claim:

1. In a power system including a rechargeable battery constituting the main system power source and a load, a dual power converter for selectively charging the battery from an external a.c. supply or supplying the load from the battery, said converter comprising: a magnetic transformer core; a plurality of transformer windings wound on said core; a first converter circuit including at least one of said windings and comprising an oscillator for producing a signal having a frequency higher than that of the external supply and connectable between the battery and such load for supplying the load; a second converter circuit including at least two of said windings and constituting an oscillator connectable between such external supply and the battery for producing a signal having a frequency higher than that of the external supply and for applying such signal to charge the battery; and switch means connected to said circuits for connecting only one said circuit at a time into its operating configuration.

2. An arrangement as defined in claim 1, further comprising current stabilizing means operatively associated with said second converter for rendering the charging current to the battery independent of variations in the frequency and amplitude of the output from the external supply, said stabilizing means including a feedback control device connected between the external supply and the output of said second converter.

3. An arrangement as defined in claim 1, further comprising a charging control circuit connected between said second converter and the battery for terminating the delivery of current to the battery in response to a signal indicating that the battery is near full charge.

4. An arrangement as defined in claim 1 wherein said second converter comprises a disconnect circuit connected in series with said battery for permitting current to flow when the output voltage from said converter has a first polarity and for opening the circuit to the battery when the output from said converter has the opposite polarity, thereby permitting the no-load voltage of the battery to be measured.

5. An arrangement as defined in claim 1 wherein there are three transformer windings all forming part of each said converter.

* * * * *